Nov. 17 1925.  
W. V. SHANNAN  
1,561,491  
MANUFACTURE OF ORGANIC COMPOUNDS BY REACTIONS INVOLVING
REPLACEMENT OF SUBSTITUENT ATOMS OR GROUPS WITH LIQUID REAGENTS  
Filed Nov. 6, 1923
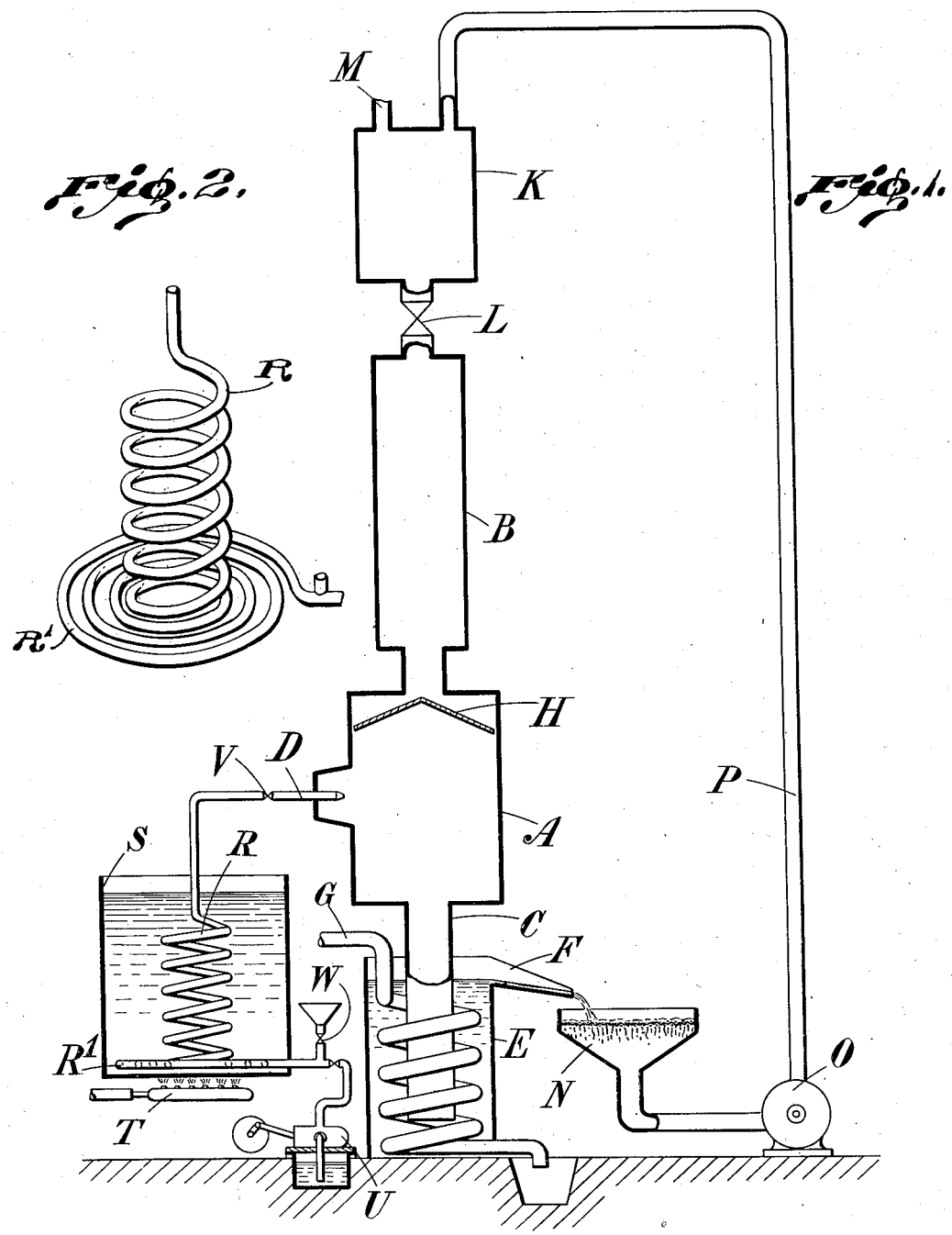
INVENTOR  
William Vinian Shannan  
By Byrnes, Stebbins & Parmelee  
his Attys Patented Nov. 17, 1925.

1,561,491

UNITED STATES PATENT OFFICE.

WILLIAM VIVIAN SHANNAN, OF LONDON, ENGLAND, ASSIGNOR TO THE GAS LIGHT AND COKE COMPANY, OF WESTMINSTER, LONDON, ENGLAND, A BRITISH COMPANY.

MANUFACTURE OF ORGANIC COMPOUNDS BY REACTIONS INVOLVING REPLACEMENT OF SUBSTITUENT ATOMS OR GROUPS WITH LIQUID REAGENTS.

Application filed November 6, 1923. Serial No. 673,137.

*To all whom it may concern:*

Be it known that I, WILLIAM VIVIAN SHANNAN, a subject of the King of England, and residing in London, England, have invented certain new and useful Improvements in the Manufacture of Organic Compounds by Reactions Involving Replacement of Substituent Atoms or Groups with Liquid Reagents, of which the following is a specification.

The present invention is for improvements in and relating to the manufacture of organic compounds by reactions involving the substitution of component atoms or groups in a compound, hereinafter referred to as the parent compound, by the action thereon of a liquid reagent, the replacement of halogen by an amino- or hydroxyl-group being an example of such a reaction.

Reactions of the type in question are illustrated by the production of o- or p-nitraniline from the corresponding nitro-chlorbenzenes by heating the latter with ammonia solution under pressure, and by the production of phenol, or substituted phenols, by heating under like conditions chlorbenzene, or an appropriate substituted chlorbenzene, with caustic soda.

According to this invention, in the manufacture of organic compounds by a reaction of the aforesaid type the parent compound is treated with excess of a liquid reagent which is solvent upon the reaction product but relatively non-solvent upon the parent compound, and the reaction is carried out with the one reacting substance supernatant upon the other, the parent compound being maintained stationary while the reagent is maintained in continuous progressive motion through the reaction vessel.

The purpose in view is not only to provide a continuously fresh reaction surface, but also continuously to carry away the dissolved reaction product for recovery in a body of liquid unmixed throughout the reaction with the main contacting body of parent substance and uncontaminated or substantially uncontaminated with the latter at the point of discharge from the vessel.

The parent substance may be heated in contact with a progressively moving supernatant body of the liquid reagent, or where the reagent is of greater specific gravity than the parent compound the latter will provide the supernatant reacting substance and the subjacent body of liquid will be furnished by the reagent.

It will be appreciated that by operating in the manner described, the parent compound is not only maintained throughout the reaction as a substantially separate body from the reagent, but also as a substantially separate body from the reaction product, the conditions throughout being unfavorable to the passage of parent substance into the adjacent body of reagent in an unaltered form.

The process may be carried out under any desired conditions of temperature and pressure.

As will be appreciated, especially in the case of reactions conducted at high temperatures, the reagent may have a certain solvent action upon the parent substance and, relatively speaking, a greater or lesser amount may therefore be temporarily unchanged in solution in the moving body of reagent. Due allowance for this relative solubility of the parent substance in the reagent under varying temperature conditions should therefore be taken into account, where such circumstance may arise, for instance, by maintaining the reaction liquor at the reaction temperature for such time as to ensure complete reaction of the so dissolved parent compound with the reagent or by the use of such a relatively increased volume of the reagent as to preclude the existence of unchanged initial material in the liquor withdrawn at the discharge point of the apparatus.

The quantity of the parent compound may be maintained substantially constant throughout the reaction by introduction into the reaction vessel of fresh charges at a rate determined by the velocity of the chemical change, and the process thereby conducted as a continuous operation.

Alternatively, the process may also be continuously carried out by introducing fresh charges of the parent compound at suitable intervals of time while maintaining throughout the continuous passage of the reagent used for effecting the reaction, or the feed of the reagent may be interrupted, the flow of total material through the reaction vessel being maintained constant, and the requisite proportion of parent compound corresponding to the quantity of the reagent previously supplied introduced into the vessel.

The reaction product may be separated in any desired manner. It is, however, preferred when a crystallizable substance, such as p-nitraniline is in question, to effect this separation by the process set forth in the specification of the concurrent United States application for Letters Patent, No. 673,131 of Siderfin and Shannan, filed November 6, 1923. The said process is characterized by bringing the heated crystallizable solution into finely divided form and in this form subjecting it to a sufficient drop in temperature to cause the rapid separation in solid form of the dissolved substance, whereby the latter is obtained in a finely crystalline condition. The solution may be subjected simultaneously to reduced pressure and to reduced temperature, and if crystallization be delayed from any cause, e. g. low setting-point of the reaction product, the reaction mixture may be discharged in sub-divided form beneath a suitable liquid, for instance, water, or liquor from a previous operation, appropriately cooled as may be required to cause the separation of solid.

According to the present invention, apparatus for carrying the aforesaid type of reaction into effect is characterized by a reaction vessel comprising an upper chamber for the supernatant reagent and a lower chamber for the subjacent reagent, one of said chambers being constructed to provide an extended, preferably a tortuous path for liquid passing thereinto from the other chamber, this latter being preferably in the form of a horizontal coil.

In the drawings which illustrate the preferred embodiment of my apparatus, Figure 1 is a diagrammatic elevation, partly in section, of the apparatus; and Figure 2 is a perspective of the worm.

One form of such apparatus for the treatment of substances of higher specific gravity than the reagents used for their decomposition, is illustrated diagrammatically in Figure 1 of the accompanying drawings wherein R is the upper chamber in the form of a vertically disposed worm, and the lower container $R^1$ is a horizontal coil forming an integral continuation of the vertical coil. S is an oil-bath heated by gas-jets T, but any other convenient means for heating the reaction vessel may be employed. U is a pump for feeding reaction liquor to the horizontal coil, and a valved branch W, external to the bath, serves for the introduction of other reaction material.

Where the starting material is of less specific gravity than the reagent employed for its decomposition, the two chambers of the aforesaid apparatus would be reversed in position. For instance, in the case of the treatment of chlor-benzene with caustic soda of greater specific gravity, the container $R^1$ would be superposed upon the vertically disposed worm R and the outlet from the latter would be situated towards the lower end.

When the reaction product is directly crystallizable, the reaction chamber may be conveniently employed in combination with the apparatus described in the aforesaid application No. 673,131 of 1923. In this event, the outlet of the coil R is provided with a nozzle D, for instance, a Koerting nozzle, capable of producing a very fine spray. This nozzle is disposed in the side of an expansion chamber A, which is a cylindrical vessel in open communication at its upper end with the interior of a scrubber tower B, and having at the base a discharge pipe C of a diameter sufficient to allow of the easy passage of both solid and liquid therethrough. The pipe C discharges into a collector E which provides for a liquid seal at the bottom of the pipe and has an overflow F for carrying away the liquor. Within the collector E is a cooling worm G.

The scrubber tower B is furnished with spreaders or other suitable means (not shown) for the distribution of liquid introduced at the head. A spreader or like device H is disposed in the upper portion of the expansion chamber A a little way beneath the inlet from the scrubber. The spreader H serves to distribute wash-liquor from the scrubber over an extended area of the expansion chamber interior.

The scrubber tower may be surmounted by a receptacle K for wash-liquor and provided with means L for controlling the flow of liquor into the scrubber. Advantageously, means such as a pipe M are provided to the scrubber tower for connection of the latter as may be required to a condenser or absorber for the recovery of residual uncondensed gas or vapours.

The overflow F discharges upon a filter N, which may be of any suitable type, for instance, in the form of a centrifugal separator. Its function is to separate crystals from the liquid with which they are discharged. Where the filtrate is utilizable as wash-liquor, as in the preparation of p-nitraniline, the filtrate receiver may be operatively connected to a pump O for the purpose of returning the filtrate by the pipe P to the feed tank K.

Means may be provided for producing a subatmospheric pressure within the chamber A.

The invention may be conveniently illustrated in its application to the manufacture of p-nitraniline from p-nitro-chlor-benzene by heating the latter with concentrated aqueous ammonia under pressure.

A charge of p-nitro-chlor-benzene is fused and run into the coil R¹ so as to form a layer along the bottom thereof, and is allowed to cool to normal temperature. The free space in R¹ and in the vertical coil R is then filled with ammonia solution (0.880). All valves being closed, the temperature is brought to about 180° C., pressure due to expansion of the coil contents being relieved as required. At this temperature the coil contents have, of course, a definite vapour tension. Ammonia solution (0.880) is then pumped into the coil until a pressure of at least 50 lbs. over the vapour tension of the contents is established; i. e. for this temperature, about 700 lbs. per square inch. The outlet valve V is then slightly opened and the pressure is maintained by the pump feeding the ammonia solution to R¹. The rate of passage of the ammonia is such that in four hours at the temperature given the volume of ammonia contained in the coil R¹ has passed through.

p-nitro-chlor-benzene and ordinary concentrated ammonia differ widely in specific gravity, and are also immiscible at ordinary temperature, while at high temperature the miscibility is only slight. On the other hand, p-nitraniline and ammonium chloride are freely soluble in aqueous ammonia at elevated temperatures. As the ammonia is slowly pumped over the nitro-chlor-benzene under pressure and at the elevated temperature employed, p-nitraniline is formed and dissolved and the solution under these conditions is carried up the coil R, undecomposed nitro-chlor-benzene remaining behind in R¹. The reaction mixture discharged from the outlet valve of R is, thereof, essentially a solution of p-nitraniline and ammonium chloride in aqueous ammonia, impurities and unchanged p-nitro-chlor-benzene being present in comparatively insignificant amount.

The reaction mixture issuing through the outlet valve of R is brought by the nozzle D into a fine state of sub-division and in this form is discharged into the expansion chamber A. A stream of water is passed down the scrubber B and through the chamber A, which is at the normal temperature and pressure. On introduction of the hot solution in a state of sub-division into the chamber A, reduction in the temperature takes place. The solution discharged from the nozzle at the commencement is comparatively weak but as the reaction goes forward it becomes more concentrated in p-nitraniline, and the latter is thrown out of solution in a minutely crystalline form and is carried down by the liquor discharged from the scrubber B into the chamber A over the spreader H. The liberation of ammonia from the solution on issuing from the nozzle materially contributes to the spray formation and to the reduction in temperature. The ammonium chloride present in the solution dissolves in the liquor discharged into the chamber, the insoluble p-nitraniline being washed through the pipe C into the collecting vessel E, and thence by the overflow F on to the filter N. The filtrate is pumped by the pump O to the feed receptacle K, and thence down the scrubber in place of the water initially employed, the use of the filtrate, which may be regarded as a saturated solution of p-nitraniline, serving to minimize loss of this derivative through its passage, either mechanically or partly in solution, into the upper portion of the expansion chamber and into the scrubber.

The p-nitraniline so obtained is by reason of its minute state of sub-division and degree of commercial purity, directly available after drying for use in the production of substantive dyes. Obtained in the manner described, the amine is in a form in which it can be readily and quickly dissolved in hydrochloric acid solution, whereas by the ordinary methods of preparation comparatively large and heavy crystals are produced which have to be filtered, dried and then finally ground in a mill before being suitable for use in preparing the diazo solution.

Gases, such as free ammonia in the case of p-nitraniline, may be recovered separately by reducing the amount of condensing liquor, or by allowing the temperature in the expansion chamber A to rise within safe limits.

It will be appreciated that the pressure and temperature obtaining within the expansion chamber must be adjusted according to the nature and temperature of the crystallizable solution introduced, and where the temperature of the solution is comparatively low, it may be necessary appropriately to reduce the pressure obtaining within the chamber in order to assist the cooling effect and bring about the desired crystallization of the solute.

The coil, or the like, constituting the upper chamber of the reaction vessel should be kept throughout full of liquid so as to avoid ebullition and consequent mixing of the reacting substances, and the temperature should be maintained as constant as possible during the process, or at least within such a range as to minimize decomposition or undesired by-reactions.

The invention is more particularly intended for the preparation of derivatives which are soluble, or substantially so, in the reaction liquor in contradistinction to the starting material so that the passage of the latter into the supernatant liquor containing the dissolved derivative is inhibited to a greater or lesser extent.

I claim:—

1. In the manufacture of organic derivatives by a reaction involving substitution in a parent organic compound of a component atom or group, the process which consists in treating the parent compound with excess of a liquid reagent which is solvent upon the reaction product but relatively to its solvent action upon said product is substantially non-solvent upon the parent compound, and effecting the reaction with the one reacting substance supernatant upon the other, the liquid reagent maintained progressively in motion through the reaction vessel and the parent compound maintained stationary therein.

2. In the manufacture of organic derivatives by a reaction involving substitution in a parent organic compound of a component atom or group, the process which consists in heating the parent compound with excess of a liquid reagent which is solvent upon the reaction product but relatively to its solvent action upon said product is substantially non-solvent upon the parent compound, and effecting the reaction with the one reacting substance supernatant upon the other, the liquid reagent maintained progressively in motion through the reaction vessel and the parent compound maintained stationary therein.

3. In the manufacture of organic derivatives by a reaction involving substitution in a parent organic compound of a component atom or group, the process which consists in heating the parent compound with excess of a liquid reagent which is solvent upon the reaction product but relatively to its solvent action upon said product is substantially non-solvent upon the parent compound, and effecting the reaction under pressure with the one reacting substance supernatant upon the other, the liquid reagent maintained progressively in motion through the reaction vessel and the parent compound maintained stationary therein.

4. In the manufacture of organic derivatives by a reaction involving substitution in a parent organic compound of a component atom or group, the process which consists in treating the parent compound with excess of a liquid reagent which is solvent upon the reaction product but relatively to its solvent action upon said product is substantially non-solvent upon the parent compound, and effecting the reaction with the one reacting substance supernatant upon the other, the liquid reagent maintained progressively in motion through the reaction vessel and the parent compound maintained stationary and sufficiently remote, as a body, from the outlet of the reaction vessel to result in the reaction product issuing therefrom substantially uncontaminated with unchanged parent compound.

5. In the manufacture of organic derivatives by a reaction involving substitution in a parent organic compound of a component atom or group, the process which consists in heating the parent compound with excess of a liquid reagent which is solvent upon the reaction product but relatively to its solvent action upon said product is substantially nonsolvent upon the parent compound, and effecting the reaction with the one reacting substance supernatant upon the other, the liquid reagent maintained progressively in motion through the reaction vessel and the parent compound maintained stationary and sufficiently remote, as a body, from the outlet of the reaction vessel to result in the reaction product issuing therefrom substantially uncontaminated with unchanged parent compound.

6. In the manufacture of organic derivatives by a reaction involving substitution in a parent organic compound of a component atom or group, the process which consists in heating the parent compound with excess of a liquid reagent which is solvent upon the reaction product but relatively to its solvent action upon said product is substantially nonsolvent upon the parent compound, and effecting the reaction under pressure with the one reacting substance supernatant upon the other, the liquid reagent maintained progressively in motion through the reaction vessel and the parent compound maintained stationary and sufficiently remote, as a body, from the outlet of the reaction vessel to result in the reaction product issuing therefrom substantially uncontaminated with unchanged parent compound.

7. In the manufacture of organic derivatives by a reaction involving substitution in a parent organic compound of a halogen component, the process which consists in treating the parent compound with excess of a liquid reagent which is solvent upon the reaction product but relatively to its solvent action upon said product is substantially non-solvent upon the parent compound, and effecting the reaction with the one reacting substance supernatant upon the other, the liquid reagent maintained progressively in motion through the reaction vessel and the parent compound maintained stationary therein.

8. In the manufacture of organic derivatives by a reaction involving substitution in a parent organic compound of a halogen component, the process which consists in heating the parent compound with excess of a liquid reagent which is solvent upon the reaction product but relatively to its solvent action upon said product is substantially non-solvent upon the parent compound, and effecting the reaction with the one reacting substance supernatant upon the other, the liquid reagent maintained progressively in motion through the reaction vessel and the parent compound maintained stationary therein.

9. In the manufacture of organic derivatives by a reaction involving substitution in a parent organic compound of a halogen compound, the process which consists in heating the parent compound with excess of a liquid reagent which is solvent upon the reaction product but relatively to its solvent action upon said product is substantially non-solvent upon the parent compound, and effecting the reaction under pressure with the one reacting substance supernatant upon the other, the liquid reagent maintained progressively in motion through the reaction vessel and the parent compound maintained stationary therein.

10. In the manufacture of organic derivatives by a reaction involving substitution in a parent organic compound of a halogen component, the process which consists in heating the parent compound with excess of a liquid reagent which is solvent upon the reaction product but relatively to its solvent action upon said product is substantially non-solvent upon the parent compound, and effecting the reaction with the one reacting substance supernatant upon the other, the liquid reagent maintained progressively in motion through the reaction vessel and the parent compound maintained stationary and sufficiently remote, as a body, from the outlet of the reaction vessel to result in the reaction product issuing therefrom substantially uncontaminated with unchanged parent compound.

11. In the manufacture of organic derivatives by a reaction involving substitution in a parent organic compound of a component atom or group, the process which consists in treating the parent compound with excess of a liquid reagent which is solvent upon the reaction product but relatively to its solvent action upon said product is substantially non-solvent upon the parent compound, and effecting the reaction with the one reacting substance supernatant upon the other, the liquid reagent maintained progressively in motion through the reaction vessel and the parent compound maintained stationary therein, fresh charges of the reagents being fed into the reaction vessel at a rate determined by the velocity of the reaction.

12. In the manufacture of organic derivatives by a reaction involving substitution in a parent organic compound of a component atom or group, the process which consists in heating the parent compound with excess of a liquid reagent which is solvent upon the reaction product but relatively to its solvent action upon said product is substantially nonsolvent upon the parent compound, and effecting the reaction with the one reacting substance supernatant upon the other, the liquid reagent maintained progressively in motion through the reaction vessel and the parent compound maintained stationary therein, fresh charges of the reagents being fed into the reaction vessel at a rate determined by the velocity of the reaction.

13. In the manufacture of organic derivatives by a reaction involving substitution in a parent organic compound of a component atom or group, the process which consists in treating the parent compound with excess of a liquid reagent which is solvent upon the reaction product but relatively to its solvent action upon said product is substantially non-solvent upon the parent compound, and effecting the reaction with the one reacting substance supernatant upon the other, the liquid reagent maintained progressively in motion through the reaction vessel and the parent compound maintained stationary, and sufficiently remote, as a body, from the outlet of the reaction vessel to result in the reaction product issuing therefrom substantially uncontaminated with unchanged parent compound, fresh charges of the reagents being fed into the reaction vessel at a rate determined by the velocity of the reaction.

14. In the manufacture of organic derivatives by a reaction involving substitution in a parent organic compound of a component atom or group, the process which consists in heating the parent compound with excess of a liquid reagent which is solvent upon the reaction product but relatively to its solvent action upon said product is substantially non-solvent upon the parent compound, and effecting the reaction with the one reacting substance supernatant upon the other, the liquid reagent maintained progressively in motion through the reaction vessel and the parent compound maintained stationary, and sufficiently remote, as a body, from the outlet of the reaction vessel to result in the reaction product issuing therefrom substantially uncontaminated with unchanged parent compound, fresh charges of the reagents being fed into the reaction vessel at a rate determined by the velocity of the reaction.

15. In the manufacture of organic derivatives by a reaction involving substitution in a parent organic compound of a component atom or group, the process which consists in heating the parent compound with excess of a liquid reagent which is solvent upon the reaction product but relatively to its solvent action upon said product is substantially nonsolvent upon the parent compound, and effecting the reaction under pressure with the one reacting substance supernatant upon the other, the liquid reagent maintained progressively in motion through the reaction vessel and the parent compound maintained stationary, and sufficiently remote, as a body, from the outlet of the reaction vessel to result in the reaction product issuing therefrom substantially uncontaminated with unchanged parent compound, fresh charges of the reagents being fed into the reaction vessel at a rate determined by the velocity of the reaction.

16. The manufacture of p-nitraniline by heating fused p-nitrochlorbenzene with excess of a supernatant body of aqueous ammonia and effecting the reaction with the aqueous ammonia maintained progressively in motion through the reaction vessel and the p-nitrochlorbenzene maintained stationary therein.

17. The manufacture of p-nitraniline by heating fused p-nitrochlorbenzene with excess of a supernatant body of aqueous ammonia and effecting the reaction under pressure with the aqueous ammonia maintained progressively in motion through the reaction vessel and the p-nitrochlorbenzene maintained stationary therein.

18. The manufacture of p-nitraniline by heating fused p-nitrochlorbenzene with excess of a supernatant body of aqueous ammonia and effecting the reaction under pressure with the aqueous ammonia maintained progressively in motion through the reaction vessel and the p-nitrochlorbenzene maintained stationary and sufficiently remote from the outlet of the reaction vessel to result in the p-nitraniline issuing from the reaction vessel substantially uncontaminated with unchanged p-nitrochlorbenzene.

19. The process of manufacture of p-nitraniline which consists in introducing p-nitrochlorbenzene into a pressure vessel covering the fused derivative with a volume of concentrated aqueous ammonia equal to the free space in the vessel, bringing the mixture to a temperature of substantially 180° C., introducing more concentrated aqueous ammonia till the pressure is substantially 700 lbs. per square inch, and maintaining the pressure throughout the reaction by fresh introduction of ammonia, the ammoniacal reaction-mixture of p-nitraniline and ammonium chloride being continuously removed from the reaction vessel, substantially as described.

In testimony whereof I affix my signature.

WILLIAM VIVIAN SHANNAN.